United States Patent
Berg et al.

(10) Patent No.: US 7,074,441 B2
(45) Date of Patent: Jul. 11, 2006

(54) **METHOD FOR THE PRODUCTION OF FERMENTED WHOLE GRAIN BARLEY WITH *RHIZOPUS*, AND PRODUCTS THEREOF**

(75) Inventors: Sofie Berg, Uppsala (SE); Johan Olsson, Uppsala (SE); Maria Swanberg, Uppsala (SE); Johan Schnurer, Uppsala (SE); Anders Eriksson, Uppsala (SE)

(73) Assignee: Lantmannen Food R&D AB, Jarna (SE)

( * ) Notice: Subject to any disclaimer, the term of this patent is extended or adjusted under 35 U.S.C. 154(b) by 6 days.

(21) Appl. No.: 10/469,410

(22) PCT Filed: Feb. 28, 2002

(86) PCT No.: PCT/SE02/00357

§ 371 (c)(1),
(2), (4) Date: Jan. 9, 2004

(87) PCT Pub. No.: WO02/069738

PCT Pub. Date: Sep. 12, 2002

(65) Prior Publication Data

US 2004/0146606 A1    Jul. 29, 2004

(30) Foreign Application Priority Data

Mar. 1, 2001   (SE) ................................ 0100704

(51) Int. Cl.
*A23L 1/105* (2006.01)
(52) U.S. Cl. ............................ 426/18; 426/44; 426/52; 426/60; 426/629
(58) Field of Classification Search ................ 426/44, 426/46, 52, 629, 618, 18, 60, 61
See application file for complete search history.

(56) References Cited

FOREIGN PATENT DOCUMENTS

| DE | 28 48 699 | 5/1980 |
| DE | 39 05 055 | 8/1990 |
| WO | WO 91/17672 | 11/1991 |

OTHER PUBLICATIONS

JP 58158148 A (Torikoshi Seifun KK) Sep. 20, 1983 (abstract) World Patents Index (on line), London, U.K.; Derwnt Publications, Ltd. (retrieved on May, 30, 2002). Retrieved from: EPO WPI Database. DW198343, Accession No. 1983-798890.

Kathleen A. Hachmeister et al., "Tempeh: A Mold-Modified Indigenous Fermented Food Made from Soybeans and/or Cereal Grains", Critical Reviews in Microbiology, 19(3): 137-188 (1993) see pp. 172-182.

RU 2095006 C1 (Ryabinkina O A) Sep. 30, 1997 (abstract) World Patent Index (on line) London, U.K.: Derwnt Publications, Ltd. (retrieved on May, 30, 2002) Retrieved from: EPO WPI database DW 199828, Accession No. 1998-320335.

RU 2086153 C1 (Ryabinkina O A) Aug. 10, 1997 (abstract) World Patents Index (online). London, U.K.: Derwent Publications, Ltd. (retrieved on May 30, 2002) retrieved from: EPO WPI database DW199815, Accession No. 1998-167581.

*Primary Examiner*—Keith Hendricks
(74) *Attorney, Agent, or Firm*—Young & Thompson

(57) ABSTRACT

An improved method for the production of fermented food products, and in particular fermented cereal products of tempech-type using whole grain cereals as raw material, makes it possible to achieve a product of good microbial, nutritional and sensory quality.

20 Claims, No Drawings

METHOD FOR THE PRODUCTION OF FERMENTED WHOLE GRAIN BARLEY WITH *RHIZOPUS*, AND PRODUCTS THEREOF

This application is a 371 of PCT/SE02/00357, filed Feb. 28, 2002, which claims priority to Swedish application 0100704-6, filed Mar. 1, 2001.

The present invention relates to improved methods for the production of fermented food products for human consumption, and in particular a fermented cereal food product based on whole grains utilising molds of the *Rhizopus* genus.

BACKGROUND OF THE INVENTION

The world's population is increasing and the food supply is getting more and more important. Furthermore, the production of food has a considerable negative effect on the environment, especially the waste from the production of animal protein. The loss of energy is also higher when food is produced from animal sources than from cereals. In order to feed a growing population, the countries of the world have to review their present usage of all raw materials potentially suitable for food and convert more of the present animal feed into food for humans.

The market for vegetarian food is growing with an increasing speed and the interest in using plant foods as a replacement or a supplement to food from animal sources is becoming more widespread. This is exemplified inter alia by the market success observed for the recently introduced mycoprotein products. One objective of the present invention is to make available improved methods for the production of fermented cereal products.

In Indonesia, meat is often substituted with tempeh (tempe), a soybean product made through fermentation with a fungus. Tempeh can also be made from other raw material such as beans, peas, wheat etc. Tempeh in Indonesia is often made at home in a small-scale production, while in Holland, Japan, and the USA, large-scale production of soybean tempeh has been implemented. The production of tempeh is however prone to microbial contamination and quality variations. Another objective of the present invention is thus to make available an improved process for the production of fermented food products of tempeh-type.

Cereals (Wheat, Barley, Rye, Oats) have excellent nutritional properties. Cereals are often used as animal feed. Wheat and oats are also used e.g. for making breakfast cereals, while wheat flour is used for bakery and bread. Barley is mainly used for beer production. Rye is mostly used for baking bread. One objective of the present invention is to make available novel cereal-based products in order to increase the use of cereals in human food, as to let the valuable properties of cereals benefit the consumer. Another objective is to produce cereal based products exhibiting improved nutritional value, such as improved mineral availability, improved vitamin status and retained low glycaemic index.

Barley (*Hordeum vulgare*) has excellent nutritional properties but is presently mainly used as animal feed. Among barley based products for human consumption, beer constitutes the largest product. In beer however, not all of the valuable properties of barley benefit the consumer. One objective of the present invention is thus to make available novel barley-based products to increase the use of barley in human food. Another objective is to produce barley-based products for human consumption, said products exhibiting improved nutritional value, such as improved mineral availability and improved glycaemic index.

PRIOR ART

More than three decades ago, Hesseltine et al. (New fermented cereal products, Dev. Ind. Microbiol., 1967, 8, 179–186) showed that fermented tempeh-type products can be prepared from wheat, oats, rye, barely, rice, and combinations of rice or wheat with soybeans, using selected strains of *Rhizopus oligosporus* obtained from Indonesian tempeh fermentation. Cracking of the dehulled seeds was found essential for good growth of the mold. Also barley was tested, in the form of dehulled and cracked seeds, and found to require a boiling time of 12 minutes prior to fermentation. The experiments of Hesseltine et al. showed that only certain strains of *Rhizopus* could be used. Those strains which possessed highly active proteolytic and lipolytic enzyme systems, but had little or no amylase activity, turned out to be best suited for the production of cereal tempeh from dehulled and cracked grain.

JP 58158148 A (JP 19820039413 of Mar. 15, 1982) discloses a method of producing fermented food, wherein beans, cereals, and nuts are grinded. Water is added, and the resulting pulp is subjected to a preliminary fermentation, after which the pulp is heated and the pH adjusted to 4.0–7.0 by the addition of an acid. Then water is removed until the water content reaches 30–65%, a microorganism belonging to the species *Rhizopus oligosporus* is added, and the pulp fermented at 28–34° C. The product is claimed to be useful in western style cooking and possible to preserve in frozen form.

More recent sources, such as Nowak (Acta Biotechnol., 12 (1992) 4, 345–348) list several problems related to the production of cereal tempeh and recommends the mixing of cereals with legumes to produce good tempeh.

According to an extensive review article by Hachmeister and Fung (Critical Reviews in Microbiology, 19(3):137–188 (1993)) the use of various cereals for the production of tempeh has been evaluated. Tempeh made from barley, wheat, and rice has been shown to have excellent flavour, texture and aroma. Hachmeister and Fung discuss a possible acid pre-treatment for the purpose of preventing the growth of unwanted microorganisms. It seems however that this was applied to soybeans only, and Hachmeister and Fung state that acidification would not be necessary when using wheat as raw material, indicating that acidification of cereal raw material is not necessary. However, according to the best knowledge of the present inventors, a cereal based product does not seem to have reached the market, which indicates that the practical problems involved have not been overcome.

In the above review, the authors Hachmeister and Fung state that previous attempts to use whole wheat without milling resulted in poor mold growth. It has also been found that tempeh produced from whole grains, including sorghum wheat, and triticale, lacked patty integrity and was not fit for slicing.

Aiming to develop new fermented cereal products for human consumption, health and safety aspects must be given high priority. Other issues to be considered include the nutritional value of the product, such as the availability of nutrients, the glycaemic index, the microbial content, flavour, texture, and the overall appearance of the product.

A specific aim of the present invention is to make it possible to preserve the structural integrity of the grain, a feature previously considered impossible. It would be very beneficial, in particular from a nutritional point of view, if this could be achieved. It is also necessary to consider the stability and manageability of the process, its economic feasibility as well as other practical or economical issues.

SUMMARY OF THE INVENTION

The present invention provides a new, improved process for the production of fermented whole grain based cereal products using a *Rhizopus* mold, and in particular novel barley based products of this type. By implementing an improved process as specified in the attached claims, incorporated herein by reference, the present inventors have produced a fermented whole grain based cereal product, and in particular a fermented barley based product, while avoiding or minimising *Rhizopus* sporulation, obtaining an agreeable flavour and texture, good appearance, and microbial safety and stability. Further, the end product is homogenous and the inventive process exhibited good repeatability and reliability.

DESCRIPTION

Barley (*Hordeum vulgare* L.) is one of the main crops in Sweden. The growing season is quite short and the resistance to drought, flood and frost is good. Barley has been grown for about 8000 years and it is known in all old cultures.

The barley kernel is harvested with the hull intact. The hull consists of palea and lemma and is strongly attached to the pericarp (fruit coat). The caryopsis consists of pericarp, seed coat, germ and endosperm. The aleurone layer in barley is multiple layered and the endosperm cells are packed with starch embedded in a protein matrix.

When barley is refined for human consumption the husk is removed by dehulling processes. The kernel can then be polished in a process known as pearling, to remove the embryo and the aleurone layer. By varying the degree of pearling the ash content is changed. Dehulled barley can also be processed into barley grits by cutting the kernels to convenient sizes.

Whole grains in this context means grains after at least partial removing of the embryo and the aleurone layer (where applicable), however maintaining the basic geometry and structural integrity of the seed. A whole grain could also be defined as a substantially botanically intact grain, however with the above exception of the removal of the embryo and the aleurone layer (where applicable).

In varieties known as "naked barley" the hull is practically absent, and the steps of dehulling and polishing can be avoided. Thus possible losses of minerals, vitamins, and important dietary fibre components is avoided. There is however an increased risk that the seeds carry microorganisms, the amount of which usually is reduced in the dehulling and polishing steps. These varieties, when used as such or after minor pre-treatment, are also encompassed in the definition "whole grain cereals".

The composition of barley varies due to environment and genotype. The major chemical constituent of the barley kernel is starch, the amount of which varies inversely with protein percentage. Starch content varies between 53–67 percent. The amylopectin content of barley starch is about 74–78%, leaving about 22–26% amylose. The protein content is generally between 9–14%.

The dietary fibre content of pearled barley is around 16 percent, and the dominating constituents are cellulose, xylan structures, lignin and β-glucans. Dietary fibres are of considerable importance in human food, since the general view is that the intake of fibres can have positive physiological effects, such as reducing blood cholesterol levels. Barley contains a sizeable amount of β-glucans, accounting for approximately 75% of the endosperm cell wall constituents. In the cell walls, β-glucans are linked to proteins, forming a barrier to the action of proteolytic and amylolytic enzymes.

It is evident for a skilled person that the differences between soybeans, the traditional raw material for tempeh, and barley are considerable. The main constituent of soybeans is protein, while that of barley is starch. Therefore the fungal growth cannot be expected to be similar on these substances. Consequently the present inventors identified large differences in the function between different *R. oligosporus* isolates when applied to the production of cereal tempeh.

The present inventors make available an improved process for the production of fermented cereal products from whole grains, and in particular fermented barley based products of tempeh type.

Specific objectives for the process and product are listed in Table 1:

TABLE 1

Desired properties of the process and product

High stability of the process
High hygienic standard
Improved texture of the fermented grains
Improved taste (neutralisation of the inherent taste of the cereal used)
Increased availability of nutrients (minerals)
Significantly reduced phytic acid concentration (>70%)
Formation of chitin/chitosan
Formation of ergosterol/provitamin D
Retained low glycaemic index
Good handling and storage properties of the product
Good adaptability/compatibility to further use It was surprisingly shown that the incubation time was the single most important parameter in the production of fermented cereal products from whole grain, and in particular in the production of whole grain barley tempeh. Furthermore, the choice of isolate, the soak time, the boil time and the pH in the soaking step were important factors, as well as the incubation temperature. Surprisingly, the concentration of spores in the inoculation step was less important. This is an interesting finding, as it implies that the improved process according to the invention has an inherent stability against variations in the inoculation step. It was also surprising, in light of previous published studies, that it was possible to use whole grain to produce not only an acceptable product, but a product of high quality and having many additional advantageous features.

Cereals are hosts to a large micro-flora, both organisms that invade the seed kernel and organisms that adhere to the surface. The most important contaminants of cereals are fungi, e.g. species of the *Aspergillus, Penicillium* and *Fusarium* genera. Among bacterial contaminants, *Bacillus subtilis* is known to cause ropiness in bread. In a microbial challenge test, performed by the present inventors, using *Bacillus subtilis, Staphylococcus aureus*, and *Escherichia coli*, the inventive process was found to exhibit an inherent resistance against microbial contamination and the end product contained no or very few of the microorganisms used in the test.

The microorganisms were added both before soaking, and after boiling, in separate experiments, in order to exemplify different modes of contamination. The results indicated that

*B. subtilis, S. aureus*, or *E. coli* neither survived nor grew in the fermented product. This is a surprising and highly satisfying result, as it is widely known that the bacterial content of tempeh can be quite high.

The present inventors also found the soaking time to be of considerable importance, as it influenced the consistency of the barley kernel to a large extent. A soaking time in the range of about 4 to 8 hours, preferably about 5 to 6.5 h, and most preferably about 6 h was found to be suitable for the production of a fermented whole grain cereal product, and in particular a fermented barley product of tempeh type. This result was surprising, as soaking has previously not been recognised as an important parameter.

Acidification of the soak water is known to prevent the growth of undesirable spoilage bacteria, yet, it does not inhibit the *Rhizopus* mold. Acidification of the soak water has been disclosed for the production of soybean tempeh, but literature sources (supra) indicate that it would not be necessary in the production of cereal tempeh. The present inventors however surprisingly found that the initial pH of the soak water should be very low, preferably below about pH 4, allowing for a slight pH rise during the duration of the soaking. Most preferably, the initial pH is about 2.5 and the end pH about 3.5.

The acidification is achieved, according to one embodiment of the present invention, by the addition of a suitable acid to the aqueous solution used in the soaking step. Suitable acids are acids generally recognised as safe (GRAS) and approved for use in food products. Examples of suitable acids include acetic acid, lactic acid and propionic acid. Preferably lactic acid is used, and preferably at a concentration of about 0.7–1% by volume.

An acidification can also be achieved by the addition of acid producing microorganisms at a point in the process, before the incubation step. Acid producing microorganisms include acetic acid producing microorganisms, lactic acid producing microorganisms and propionic acid producing microorganisms. The group lactic acid producing microorganisms include microorganisms of the genus *Lactobacillus, Lactococcus, Leuconostoc, Pedicoccus*, and *Streptococcus*. These microorganisms are characterized in that they are Gram positive, non-sporulating, catalase-negative, exhibit a fermentative metabolism and that lactic acid is their major end product during sugar fermentation. They are further acid tolerant and aero tolerant anaerobes. Examples of species used in the production of foods and thus readily suitable for use according to the present invention include *Lactobacillus acidophilus, Lactobacillus casei, Lactobacillus plantarum, Lactobacillus san francisco* and *Lactobacillus reuteri*. Also species of the remaining groups or genera *Leuconostoc, Pedicoccus*, and *Streptococcus* have utility in food production and can be used or adapted for use in a process according to the present invention.

Partial cooking or boiling of the cereal raw material is also known to play a vital role in the production of fermented cereal products. The present inventors however surprisingly found that already a short boiling time was sufficient, whereas prolonged boiling times resulted in negative consequences for the product quality. The boiling time is preferably in the interval of about 7–15 minutes, a boiling time of about 10 minutes being most preferred.

Whereas previous studies mostly have involved boiling steps only, the present inventors found a specific combination of soaking and boiling to be most favourable for the quality of the end product. A longer boiling time did not give the same elasticity of the kernel as did the combination of soaking and boiling. This effect, highly important for the sensory quality (mouthfeel), has not been reported earlier. For example, when barley grains were soaked for 6 hours and then boiled for 30 min, the grains became very sticky due to gelatinisation of the starch.

It was further shown, that the choice of isolate influences both taste and colour of the end product. Ten different isolates of *R. oligosporus* (ex soy-tempeh) of different geographic origin were evaluated. See Table 2. The isolates will be referred to by their culture number (JXXX, Dept. of Microbiology, Swedish University of Agricultural Sciences, Uppsala, Sweden). Among the *R. oligosporus* isolates used, especially J189, J401, and J373 exhibited good properties with regard to consistency, smell, and colour of the end product.

TABLE 2

The studied isolates

| Culture No. | Deposit No. |
|---|---|
| J189 | NRRL 2710 |
| J190 | NRRL 5905 |
| J373 | CBS 337.62 |
| J374 | CBS 339.62 |
| J398 | ATCC 48011 |
| J399 | ATCC 48012 |
| J400 | ATCC 48109 |
| J401 | ATTC 64063 |
| J402 | ATTC 76011 |
| J403 | CBS 228.95 |

As cereals are known to contain anti-nutrients, such as phytic acid, which chelates divalent cations and prevent these form being absorbed in the human intestinal tract, it was one aim of the present invention to address this problem. It was desired to lower the concentration of phytic acid, and thereby make possible a higher uptake of minerals as the amount of chelated minerals is minimised. Surprisingly, the present invention makes it possible to lower the phytic acid content by more than 70%.

The present inventors have found that the incubation is best carried out at a temperature in the range of about 30–37° C. Further, the incubation time was found to be of considerable importance. For the production of a fermented cereal product, and in particular a fermented whole grain barley based product of tempeh type, an incubation time of about 15–25 hours is preferred. An incubation of about 17–23 hours is considered most preferred.

It was found that the fungus growth was very good, and the fungal mycelia evenly distributed in the entire product. The product was coherent and easy to handle, e.g. to slice. The inventive product also retained its shape during further processing, such as boiling or frying, making it very useful as an ingredient in various dishes (e.g. in a stir-fry dish). This result is surprising in light of the prior art advising against the use of whole cereal grains.

The inventive process yields an end product having only a very faint, neutral and pleasant taste and flavour. The product also has a light, neutral colour. Both these factors, not encountered in traditional products of tempeh type, makes it easy to add a desired taste, flavour or colour to the inventive product. Natural or artificial flavouring and colouring agents can be added, either to the cereal raw, material before fermentation, or to the end product, or both to the raw material and the end product, depending on the colouring and flavouring agents used. Suitable colouring and flavouring agents are natural colours and flavours, salt, spices and dehydrated, dried or roasted vegetables, such as dry onions etc. According to one embodiment of the invention, the product is blanched in water containing the desired flavouring and colouring agents.

The present inventors have also found that the relative humidity of the gas phase surrounding the cereal mass during incubation plays an important role. This is associated with the question of even packaging of the inoculated mass before incubation. In large scale production, it will be important to control the relative humidity and the gas composition, as well as the circulation of the surrounding atmosphere during incubation.

The present inventors also found, that the inoculated cereal mixture can be deep frozen before fermentation without loss of microbial quality. Not only was it possible to produce an end product of high quality, it was surprisingly found that the freezing step had a retarding effect on the sporulation behaviour of the majority of the isolates tested.

Freezing of the fermented product was also attempted. Surprisingly, the product, could be frozen and thawed without damage to its structure or quality in other aspects. This result was unexpected, as fungal mycelia could be expected to be destroyed in the freezing, leading to unwanted deterioration of quality.

It was also surprisingly found, that the inventive process was successful in retaining the grain structure of the cereal used. The resulting end product had a very appealing mouthfeel and gave a chewing resistance resembling that of meatloaf.

The hygienic stability of the inventive process was shown to be very high and inherently resistant to contaminations. The end products exhibited high stability, as evidenced by their long shelf-life. It was shown that products produced according to the inventive process can be stored at +8° C. for over three months. Overall, the desired properties of both the process and the product (cfr. Table 1) were achieved by the inventive process/product.

EXAMPLES

1. Process Conditions 1.1 Soaking Conditions

A total of 300 g grain ("Gourmetkorn" pearled and heat-treated barley, and "Korngryn", barley grits, both from Kungsömen, Järna, Sweden) was soaked in 500 ml of tap water. Lactic acid was added to the soak water to achieve various concentrations: 0.044, 0.462 and 0.88% by volume. Soaking times of 1, 3.5 and 6 hours were evaluated. The flask was sealed and left at 2° C.

An evaluation of the results showed that the soaking time should be in the range of about 4 to 8 hours, preferably about 5 to 6.5 h, and most preferably about 6 h. A concentration of lactic acid in the range of about 0.7–1% by volume was found advantageous.

1.2 Boiling

The soaking water was drained off and the grains were added to 750 ml of boiling water containing 6 g salt (2 g/100 g of dry grains) and lactic acid at different concentrations: 0.029, 0.3095, and 0.59%. The grains were then boiled for 10, 20, or 30 min.

The results indicate that a boiling time of about 10 minutes is best suited under the conditions used. A longer boiling time led to gelatinisation of the starch.

1.3 Acidification

The effect of acidification and the consequences of boiling at an acidic pH were evaluated by adding lactic acid to the boiling water. A concentration of about 0.01–0.1% by volume was found to be advantageous.

2. Evaluation of R. oligosporus Isolates

Since an initial screening showed that the incubation time and the choice of isolate were the two most important parameters during production of fungal fermented cereal grains, the present inventors wanted to investigate if other isolates of R. oligosporus could produce acceptable end product.

Ten different isolates of Rhizopus oligosporus were maintained on silica gel at 2° C. The isolates were from Centraalbureau voor Schimmelcultures (CBS), Delft, The Netherlands or American Type Culture Collection (ATCC), Manassas, Va., USA or Northern Regional Research Laboratory (NRRL), Peoria, Ill., USA, but are hereinafter referred to by their culture number (JXXX, Dept. of Microbiology, Swedish University of Agricultural Sciences, Uppsala, Sweden) (cfr. Table 2):

J189, J190, J373, J374, J398, J399, J400, J401, J402, and J403.

2.1 Preparation of Inocula

To obtain sporangiospore suspensions, isolates were grown on Malt Extract Agar (MEA, Oxoid, Basingstoke, England) plates (screening) or slants (after screening) supplemented with 100 ppm chloramphenicol (MEAC, Sigma chemical Co, St Louis, Mo.) for 5–6 days at 30° C. Spores were harvested by adding physiological salt solution (0.9% NaCl) and scraping with an inoculation loop. Spore suspensions were removed and then mixed by shaking. Suspensions were washed two times and the spores were then resuspended in physiological salt solution to desired concentrations.

The concentration of the suspensions was determined using a counting chamber. Viability tests were performed occasionally on MEAC plates to confirm the concentration of the spore suspensions.

2.2 Fermentation of Cereal Grains

Initial experiments showed that the barley grits ("Korngryn") did not give satisfactory results, manifested as a high degree of gelatinization, as well as high bacterial counts. Thus the study was continued with whole grains only.

"Gourmetkorn" was soaked, boiled, drained and cooled in the same way as a model system [soaking in lactic acid solution (0.88% by volume) for 6 hours, boiling in lactic acid solution (0.029% by volume) for 10 minutes], found to give excellent results in a screening assay.

Grains were prepared according to this, and then inoculated with ten different isolates to a concentration of approximately $1.5 \times 10^4$ spores/gram. All ten isolates of R. oligosporus were used separately in the study: For each isolate, the inoculated grains were packed in five petri dishes. Two plates were incubated at 30° C. and left for 30 and 40 h and two plates at 35° C. for 20 and 25 h. One petri dish per isolate was transferred to the freezer before incubation. When the fermentation was stopped, the cakes were transferred to the freezer. Before sensory evaluation, all cakes were thawed at room temperature for 2 h.

Since a screening study showed that the responses with relation to colour and colony forming units on DG18 (Dichloran Glycerol 18%, Oxoid Ltd.) were highly correlated, the results of this study were only evaluated for consistency, odour and colour by a test panel. To determine if any isolate caused great pH changes, the pH of the cakes incubated at 35° C. was also measured. Ten isolates were used and the inoculated grains were incubated at 30 and 35° C. for 20–40 h, resulting in a wide variety of fermented cakes.

Growth of mycelia tended to be surprisingly different between different isolates. Some produced a thick elastic mycelium, sometimes sporulated, and some produced more cotton-like mycelia with a slightly acid odour. Sporulation was described by a high colour value. Results were determined as odour, consistency, colour and pH.

The results fell into three major groups, where one group comes closest to what was defined as acceptable products (good). Isolate J401 grown at 35° C. for 20 and 25 h scored best in the evaluation. J401 showed good growth already after 17 h of incubation and after 25 h the mycelium was very thick and not highly sporulated. The odour was described as neutral to very good when grown at 35° C. and when grown at 30° C. the odour had a more acid touch.

2.3 Fermentation After Freezing Conditions

Since the present inventors also had an interest in knowing whether spores survive freezing conditions well enough to produce similar cakes as fresh inoculated grains do, grains were inoculated with spore suspensions of all isolates and incubated after two weeks storage in the freezer (−18° C.). Plates were thawed for 2 h at 5° C. and then incubated at 35° C. for 20 h.

Three groups of cakes were identified. Five isolates were classified as cakes with good mold growth (J189, J401, J398, J374 and J400). Four cakes were classified as cakes with less good mold growth (J190, J373, J402, and J403) and only one isolate was sporulated (J399).

Surprisingly, this result differed a lot from the results obtained in trial runs, in which the cakes were incubated immediately after inoculation and packaging. Sporulation was almost not detectable in the cakes after freezing followed by incubation, while sporulation was abundant in many of the cakes incubated without previous freezing. Only J399 exhibited almost identical characteristics under both conditions. Apparently the freezing step has a retarding effect on the sporulation behaviour of most isolates.

3. Hygienic Evaluation of Fermented Cereal Cakes

From a fermented cereal cake, produced according to the inventive method, 20 g was homogenised in 2% peptone water (Oxoid Ltd., UK) with a stomacher (Stomacher, Lab Blender Model 400 (BA7021), Seward Medical, London, England) and a serial dilution was used to analyse the content of fungi and bacteria.

Fungal growth was analysed on Dichloran Glycerol (18%) Agar Base (DG18, Oxoid Ltd., UK). Dichloran reduces the radial growth of Zygomycetes and makes it possible to detect the presence of other fungi. Aliquots of 100 µl were surface plated and plates were incubated at 25° C. for 5 days.

The total number of bacteria was determined on Tryptone Glucose Extract Agar (TGEA, Oxoid Ltd., UK) supplemented with delvocid (0.1 g/liter) (Gist-brocades, Delft, The Netherlands) to inhibit fungal growth. Aliquots of 1 ml were mixed with 20 ml media, over layered with TGEA and then incubated at 30° C. for 72 h.

Enterobacteriaceae was enumerated on Violet Red Bile Glucose Agar (VRBG, Oxoid) supplemented with delvocid (0.1 g/l). Aliquots of 1 ml were mixed with 20 ml media, over layered with VRBG and then incubated at 37° C. for 24 h.

The amount of sporeforming bacteria was enumerated on Reinforced Clostridial Agar (RCM, Oxoid Ltd., UK. Heat-treatment at 80° C. for 13 min were performed to kill vegetative cells and then 100 µl aliquots were surface plated. RCM Agar was supplemented with 0.005% neutral red (Fluka, LabKemi, Stockholm, Sweden) and 0.02% cycloserine (Sigma, St Louis, USA) to differentiate between *Clostridium* spp. and *Bacillus* spp. Neutral red acts as pH indicator, which gives yellow zones when *Clostridium* spp. grow and cycloserine inhibits growth of *Bacillus* spp. The plates for *Bacillus* analysis were incubated at 37° C. for 24 h and *Clostridium* plates were incubated at anaerobic conditions at 37° C. for 72 h.

The results showed that the acidification diminished bacterial growth in the end product. In general, the hygienic evaluation showed that the inventive process produces fermented products of high hygienic quality. This was also confirmed by the microbial challenge test, presented below.

4. Hygienic Quality—Storage at +4° C.

The fermented product was produced according to the inventive process, and cakes of said product were boiled in water for 3 minutes, directly following incubation. After cooling in room temperature, cakes of the fermented product were placed in clean petri dishes and placed at +4° C. Samples (25 gram) from the cakes were taken periodically during the storage time. The samples were further treated and homogenized as described in 3. Hygienic evaluation of fermented cereal cakes (supra).

The total number of bacteria, the amount of *Bacillus subtilis* and fungal growth were measured in this study. The results are shown in Table 3. The methods for analysing them were the same as described above. The product exhibited a surprisingly high degree of hygienic stability, with no growth of bacteria and fungi during 15 weeks of storage at 4° C.

TABLE 3

Content of microorganisms in fermented product during long-term storage

| Day | Total number of bacteria (log cfu/g) Detection limit: $10^1$ cfu/g | Bacillus (log cfu/g) Detection limit: $10^2$ cfu/g | Fungi (log cfu/g) Detection limit: $10^2$ cfu/g | pH[1] |
|---|---|---|---|---|
| 0 | b.d.[2] | b.d. | b.d. | 5.5 |
| 7 | b.d. | b.d. | b.d. | 5.7 |
| 14 | 2.9 | b.d. | b.d. | 5.5 |
| 21 | b.d. | b.d. | b.d. | 5.5 |
| 28 | b.d. | b.d. | b.d. | 5.6 |
| 71 | b.d. | b.d. | b.d. | 5.4 |
| 107 | b.d. | b.d. | b.d. | 5.3 |

[1]measured in the first decimal dilution
[2]b.d. = below detection

A study of spoiling microorganism in fresh or stored soybean tempeh was performed of Nout et al. (Nout, M. J. R., G. Beernink, et al. (1987). "Growth of *Bacillus cereus* in soyabean tempeh." *Int. J. Food Microbiol.* 4:293–301). The results are shown below for comparison (Table 4):

TABLE 4

Content of microorganisms in soybean tempeh

| | pH | Total number of bacteria (log cfu/g) | Bacillus cereus (log cfu/g) | Yeasts (log cfu/g) |
|---|---|---|---|---|
| Tempeh fresh | 6.65 | 8.43 | <2.7 | <1.7 |
| Tempeh stored (+4° C., 17 days) | n.d.[1] | 8.59 | <2.7 | <1.7 |

[1]not determined

Further, a survey of the microbial quality of commercial soybean tempeh was done in the Netherlands. This study shows data (Table 5) from actual samples collected in stores, representing products that been stored up to 4 weeks after production. (Samson, R. A., J. A. van Kooij, et al. (1987). "Microbiological quality of commercial tempeh in the Netherlands." *Journal of Food Protection* 50(2): 92–94.)

TABLE 5

Percentage of commersial samples containing different amounts of bacteria

|  | More than $10^2$ counts/gram | More than $10^5$ counts/gram |
|---|---|---|
| Total number of bacteria | 100% | 98% |
| Bacillus cereus | 16% | 11% |
| Staphylococcus aureus | 22% | 13% |

Both *Bacillus cereus* and *Staphylococcus aureus* can cause food poisoning. In this survey about 11% of the samples contained *B. cereus* and about 13% of the samples contained *S. aureus* in numbers, which may cause food poisoning.

5. Sensory Evaluation of Fermented Cereal Cakes

An untrained panel of 5 persons evaluated the fermented cereal cakes after incubation. Cakes (n=36) were evaluated according to odour (scale 1–5, where 1 corresponds to unacceptable and 5 is very good), consistency (scale 1–5), and colour (scale 1–7). Colour was described by using a colour scale. A colour degree of 1 corresponds to no growth, 3–5 corresponds to acceptable, whitish colours and 6–7 corresponds to the dark colours of sporulated cakes. Acceptable cakes (good hygienic quality and not highly sporulated, n=18) were fried in oil and evaluated for taste using scale 1 (not good) to 5 (excellent).

The fermented cereal calves were frequently rated "neutral" to "good" with respect to odour, and 1–4 with respect to taste, indicating that the taste was generally less pleasant than the odour. Cakes considered tasty (3.5, 4.6, 4.0) were also produced, indicating the feasibility of the inventive method.

The products, produced according to the inventive method, were also subjected to tests by skilled panels in food industry during the priority year. The panels gave the product high ratings for taste, mouthfeel and overall appearance. Practical tests involving further processing in the R&D departments of different manufacturers showed that the product was suitable for use as a component of a large range of various dishes. The fermented whole grain product exhibited good handling qualities and could be sliced, chopped, boiled and fried without loss of sensory properties.

6. Microbial Challenge

In order to evaluate the microbial stability of the inventive process and its resistance to contamination, selected microorganisms were added during the process. The bacteria used in this study were *B. subtilis*, representing spore-forming bacteria, *S. aureus* chosen as a producer of heat resistant toxin and *E. coli* chosen as a common contaminant and an often used indicator of food safety. The *B. subtilis* culture was isolated from cereals and provided by Ann-Sofie Johansson, Kungsömen AB, Järna, Sweden. *S. aureus* (SLV-350, ATCC 25923) and *E. coli* (SLV-082) were isolated from reference samples (2000:1) provided by the Swedish National Food Administration, Uppsala, Sweden.

6.1 Preparation of the Challenge Microorganisms

The challenge microorganisms were maintained on selective medium and colonies of the competing organism were mixed with 2% peptone water. *B. subtilis* suspension was heat treated at 80° C. for 13 min. A serial dilution was done for analyses on an appropriate medium. *B. subtilis* and *E. coli* were incubated at 37° C. for 24 h, while *S. aureus* was incubated at 37° C. for 48 h.

6.2 Addition of the Challenge Microorganisms before Soaking

The challenge microorganisms was added to 320 g barley (gourmetkorn) in amounts proportional to realistic contamination, well mixed and rested for 30 min to give the added organisms a chance to adhere to the barley. The barley was soaked in water with 0.88% LAc (KEBO Lab AB, Spånga) at 2° C. for 6 h. After sampling, the remaining part of the barley was boiled for 10 min with 0.029% LAc (KEBO Lab AB, Spånga) and 6 g NaCl per 750 ml. The boiled barley was dried and cooled (to approx. 40° C.) and *R. oligosporus* ($10^5$ spores/gram barley) was inoculated. The inoculated mixture was packed in petri dishes and incubated at 35° C. for 20 h.

Samples were taken (a, b, c, d) and for each analysis 20 g was used.

(a) After addition of challenge organisms for analysing the start levels
(b) After soaking for analysing the survival/growth of the challenge organism
(c) After boiling to analyse the survival of the competing organism during boiling
(d) On the fermented cake 6.3 Addition of the Challenge Microorganisms after Boiling A fermented barley product was made according to the above-mentioned recipe. After drying and cooling a suspension of *R. Oligosporus* ($10^5$ spores/gram barley) and the challenge bacteria were added to the boiled barley. The cakes were incubated at 35° C. for 20 h.

Samples were taken (a, b) and for each analysis 20 g was used.

(a) Inoculated barley was sampled to get a start value
(b) On the fermented cake

*B. subtilis* and *E. coli* were enumerated the same way as in the prestudies. *S. aureus* was analysed on Baird-Parker medium (Oxoid Ltd., UK) with Egg Yolk Emulsion 20%, supplemented with delvocid (0.1 g/liter) and incubated at 37° C. for 48 h.

The results showed that *B. subtilis*, *S. aureus*, or *E. coli* neither survived nor grew in the fermented product (Tables 6 and 7). In fact, for all tested microorganisms, the level of contamination in the products were significantly lower than the threshold values set by the Swedish National Food Administration (Guidelines for microbial evaluation of food samples):

TABLE 6

Challenge test I: Survival of bacteria, when added before soaking

| | Bacterial counts (log cfu/g) | | |
|---|---|---|---|
| | Addition | End product | Legal threshold values |
| B. subtilis | 3.9 | b.d.[1] | 3[2] |
| S. aureus | 4.7 | b.d. | 2[3] |

[1]b.d. below detection limit (less than $10^2$ cfu/g)
[2]B. cereus
[3]Coagulase positive staphylococcae

TABLE 7

Challenge test II: Survival of bacteria, when added after boiling

|  | Bacterial counts (log cfu/g) | | |
|---|---|---|---|
|  | Addition | End product | Legal threshold values |
| B. subtilis | 3.7 | b.d.[1] | 3[2] |
| S. aureus | 4.8 | b.d. | 2[3] |
| E. coli | 4.0 | 2.9 | 3[4] |

[1]b.d. below detection limit (less than $10^2$ cfu/g)
[2]B. cereus
[3]Coagulase positive staphylococcae
[4]Enterobacteriaceae - total count The conclusion is that the inventive product exhibits high hygienic standard and stability.

7. Nutritional Evaluation

The product was analysed according to the below referenced methods. The results are shown in Table 8.

TABLE 8

Product properties

| Content | Boiled barley | Soaked and boiled barley | Fermented barley |
|---|---|---|---|
| β-glucans (total)[1] (g/100 g d.m.) | 5.0 | 4.8 | 4.3 |
| β-glucans (soluble)[1] (g/100 g d.m.) | 2.0 | 1.6 | 1.5 |
| β-glucans (insoluble)[1] (g/100 g d.m.) | 3.0 | 3.2 | 2.8 |
| Phytic acid[2] (μmol/g) | 6.5 | 3.8 | 2.2 |
| HI*-analysis[3] | 43 |  | 73 |
| Predicted GI** | 45 |  | 71 |

*HI = hydrolysis index
**GI = glyceamic index
[1]Åman, P, Graham, H (1987). 1987. Analysis of total and insoluble mixed linked (1-]3),(1-]4)-Beta-D-glucans in barley and oats. Journal of agricultural and food chemistry. 35: 704–709.
[2]Skoglund, E. Carlsson, N.-G. and Sandberg, A.-S. (1997). Determination of isomers of inositol mono- to hexaphosphates in selected foods and intestinal contents using high-performance ion chromatography. J. Agric. Food Chem. 45(2): 431–436; Skoglund, E. Carlsson,N.-G. and Sandberg, A.-S. (1998). High performance chromatograpic separation of inositol phosphate isomers on stron anion exchange columns. J. agric. Food Chem. 46(5): 1877–1882.
[3]Y. Granfeldt, I. Bjorck, A. Drews and J. Tovar. An in vitro procedure based on chewing to predict metabolic response to starch in cereal and legume products. European Journal of Clinical Nutrition (1992) 46, 649–660.

Although the invention has been described with regard to its preferred embodiments, which constitute the best mode presently known to the inventors, it should be understood that various changes and modifications as would be obvious to one having the ordinary skill in this art may be made without departing from the scope of the invention as set forth in the claims appended hereto.

The invevtion claimed is:

1. A method for the production of a fermented food product based on whole grain cereal raw material with minimal surface alternations, comprising the following steps:
   soaking the whole grain cereal raw material in an aqueous solution,
   heat treating the whole grain cereal raw material in an aqueous medium,
   acidification of the whole grain cereal raw material,
   inoculation with a fungus of the Rhizopus genus, and
   incubation of the inoculated whole grain cereal raw material, and wherein the cereal raw material comprises barley (Hordeum vulgare) in the form of whole grains.

2. The method according to claim 1, wherein the acidification consists of the addition of an organic acid to the aqueous solution used for the soaking of the cereal raw material.

3. The method according to claim 1, wherein the acidification consists of the addition of acid producing bacteria chosen from the group consisting of acetic acid producing bacteria, lactic acid producing bacteria and propionic acid producing bacteria.

4. The method according to claim 1, wherein the aqueous solution used for soaking the cereal raw material has an initial pH of about pH 2.5.

5. The method according to claim 1, wherein the soaking time is in the interval of 4 to about 8 h.

6. The method according to claim 1, wherein the heat treatment time is in the interval of about 5 to about 10 min.

7. The method according to claim 1, wherein the fungus of the Rhizopus genus is Rhizopus oligosporus.

8. The method according to claim 1, wherein the fungus of the Rhizopus genus is selected from the groups consisting of Rhizopus oligosporus isolates J189 (NRRL 2710), J373 (CBS 337.62), and J401 (ATCC 64063).

9. The method according to claim 1, wherein the fungus of the Rhizopus genus is the Rhizopus oligosporus isolate J401 (ATCC 64063).

10. The method according to claim 1, wherein the incubation is performed at a temperature in the interval of 30° C. up to and including 37° C.

11. The method according to claim 1, wherein the inoculated whole grain cereal raw material is deep-frozen and thawed before fermentation.

12. The method according to claim 1, wherein the fermented product is boiled or blanched in an aqueous solution after completion of the incubation.

13. The method according to claim 1, wherein the fermented product is deep-frozen after completion of the incubation.

14. The method according to claim 12, wherein colouring and flavouring agents are added to the aqueous solution used for boiling or blanching the incubated product.

15. A fermented food product produced by the method according to claim 1.

16. The method according to claim 1, wherein the incubation time is for about 17–23 hours.

17. A fermented food product comprising whole cereal grains and a fungus of the Rhizopus genus, wherein said whole cereal grains comprises barley (Hordeum vulgare).

18. The fermented food product according to claim 17, wherein the fungus of the Rhizopus genus is selected from the group consisting of Rhizopus oiligosporus isolates J189 (NRRL 2710), J373 (CBS 337.62), and J401 (ATCC 64063).

19. The fermented food product according to claim 18, wherein the fungus of the Rhizopus genus is the Rhizopus oligosporus isolate J401 (ATCC 64063).

20. The fermented food product according to claim 17, wherein the phytic acid content of the cereals is reduced by at least 70% compared to the phytic acid content of the unprocessed cereals.

* * * * *